United States Patent [19]

Kanai et al.

[11] Patent Number: 5,218,391
[45] Date of Patent: Jun. 8, 1993

[54] INSTANT CAMERA WITH REVERSABLE ROLLERS FOR CLEANING

[75] Inventors: Masaharu Kanai, Tokyo; Fumito Obikawa, Nagano, both of Japan

[73] Assignee: Fuji Photo Film Co., Ltd., Kanagawa, Japan

[21] Appl. No.: 796,210

[22] Filed: Nov. 22, 1991

[30] Foreign Application Priority Data

Nov. 22, 1990 [JP] Japan ................... 2-319227

[51] Int. Cl.$^5$ .............................. G03B 17/50
[52] U.S. Cl. ......................... 354/86; 354/83
[58] Field of Search ................ 354/83, 86, 87

[56] References Cited

U.S. PATENT DOCUMENTS

| | | | |
|---|---|---|---|
| 3,561,340 | 2/1971 | Erlichman | 95/13 |
| 3,753,392 | 8/1973 | Land | 95/13 |
| 3,810,210 | 5/1974 | Adamski et al. | 354/86 |
| 5,023,636 | 6/1991 | Douglas | 354/86 |

*Primary Examiner*—Michael L. Gellner
*Assistant Examiner*—Nicholas J. Tuccillo
*Attorney, Agent, or Firm*—Young & Thompson

[57] ABSTRACT

An instant camera is provided with a motor rotatable in normal and reverse directions, a claw member for pushing an exposed film unit out of a film pack, and a pair of spreading rollers for ejecting the exposed film unit from the camera by applying pressure thereto. The motor rotates in the normal direction upon taking a photograph, so that the spreading rollers rotate in normal directions. The force of the motor is simultaneously transmitted to the claw member via a clutch mechanism. An operable member is provided in a film pack chamber. To clean the spreading rollers, the door of the empty film pack chamber is opened. When the operable member is pressed, the motor starts rotating reversely. During the resulting reverse rotation of the spreading rollers, a cloth for wiping the spreading rollers can be applied thereto, so that processing solution or dirt sticking to the rollers can be removed. Reverse rotation of the motor is prevented by the clutch mechanism from being transmitted to the claw member.

12 Claims, 6 Drawing Sheets

INSTANT CAMERA WITH REVERSABLE ROLLERS FOR CLEANING

BACKGROUND OF THE INVENTION

1. Field of the Invention

The present invention relates to an instant camera, more particularly to an instant camera having spreading rollers that are easily cleanable.

2. Description of the Prior Art

In an instant camera, film units of a self-processing type, called "instant film", are used. These can be peel-apart type film units or monosheet type film units. In a film unit of the peel-apart type, an image-receiving sheet is superposed on a photosensitive sheet after exposure, between which sheets developing solution is spread. When the photosensitive sheet is peeled off the image-receiving sheet at the end of a predetermined period, a photographic image appears on the inside of the image-receiving sheet. In a film unit of the monosheet type, the photosensitive and image-receiving sheets are integrated in a superposed state. When the processing solution is spread between the two sheets after exposing the photosensitive sheet, a photographic image appears on the outer side of the image-receiving sheet.

In an instant camera for use with film units of the monosheet type, the depression of a release button for taking a photograph operates a shutter, and starts a motor to operate a claw member. The claw member has a claw on its one end which pushes the exposed uppermost film unit out of a film pack from a stack of film units contained in the film pack. When the film unit is squeezed and advanced between spreading rollers, a processing solution pod provided at the front end of the unit is ruptured. The processing solution pressed out of the solution pod is spread with a uniform thickness between the photosensitive and image-receiving sheets while the film unit passes between the spreading rollers. After the film unit is ejected from the instant camera, a photographic image gradually forms on the image-receiving sheet.

It is necessary to clean the spreading rollers when leaking processing solution, dirt or the like has stuck thereto. When processing solution sticks to the rollers and hardens, the portion of the rollers with the hardened solution is enlarged. Thereafter, the processing solution cannot be spread with a uniform thickness, so that there can be irregularity in development. For the purpose of allowing cleaning of the spreading rollers, conventional instant cameras have such constructions that the spreading rollers are detachable from a main body of the camera, or their peripheral surfaces can be uncovered to apply a wiping cloth or paper thereto.

In the case of detachable rollers, however, there is a problem in that the number of camera parts increase, which raises the cost of the camera. Moreover, detachment of the spreading rollers can cause damage, e.g. scratches on the surface of the spreading rollers. The provision of exposable rollers, on the other hand, also has a disadvantage in that the spreading rollers cannot be completely cleaned. This is because the spreading rollers are connected to the motor via reduction gears, and so cannot be manually rotated.

SUMMARY OF THE INVENTION

In view of the foregoing problems, an object of the present invention is to provide an instant camera in which the entire peripheries of the spreading rollers are easily cleanable without providing a complicated structure.

Another object of the present invention is to provide an instant camera in which a cloth used for wiping the spreading rollers will not be caught between the spreading rollers during a cleaning operation.

In order to achieve the above and other objects and advantages of this invention, an instant camera according to the present invention is provided with means for reversely rotating the motor in order to allow cleaning, and a clutch mechanism for transmitting a drive force to a claw member, which clutch mechanism transmits the drive force of the motor to the spreading rollers without transmitting it to the claw member that ejects the exposed film unit, when the motor is reversely rotated for cleaning. When the motor is normally rotated, a film unit after exposure is pushed out of the film pack by the claw, at the same time that processing solution is spread between spreading rollers.

In accordance with the present invention, the spreading rollers are reversely rotated for cleaning, so that manual application of a wiping cloth to the spreading rollers is sufficient for cleaning them. Thus the cleaning operation is easy. During reverse rotation of the motor, the claw member is prevented from operating, so that the spreading rollers can be safely cleaned with no fear of damaging the claw member. Rotation of the spreading rollers takes place in the directions opposite to the direction of rotation that advances the film unit, so that the wiping cloth is in no danger of being caught between the spreading rollers.

BRIEF DESCRIPTION OF THE DRAWINGS

The above and other objects and advantages of the present invention will become more apparent form the following detailed description when read in connection with the accompanying drawings, in which.

DETAILED DESCRIPTION OF THE PREFERRED EMBODIMENT

Figure 1:
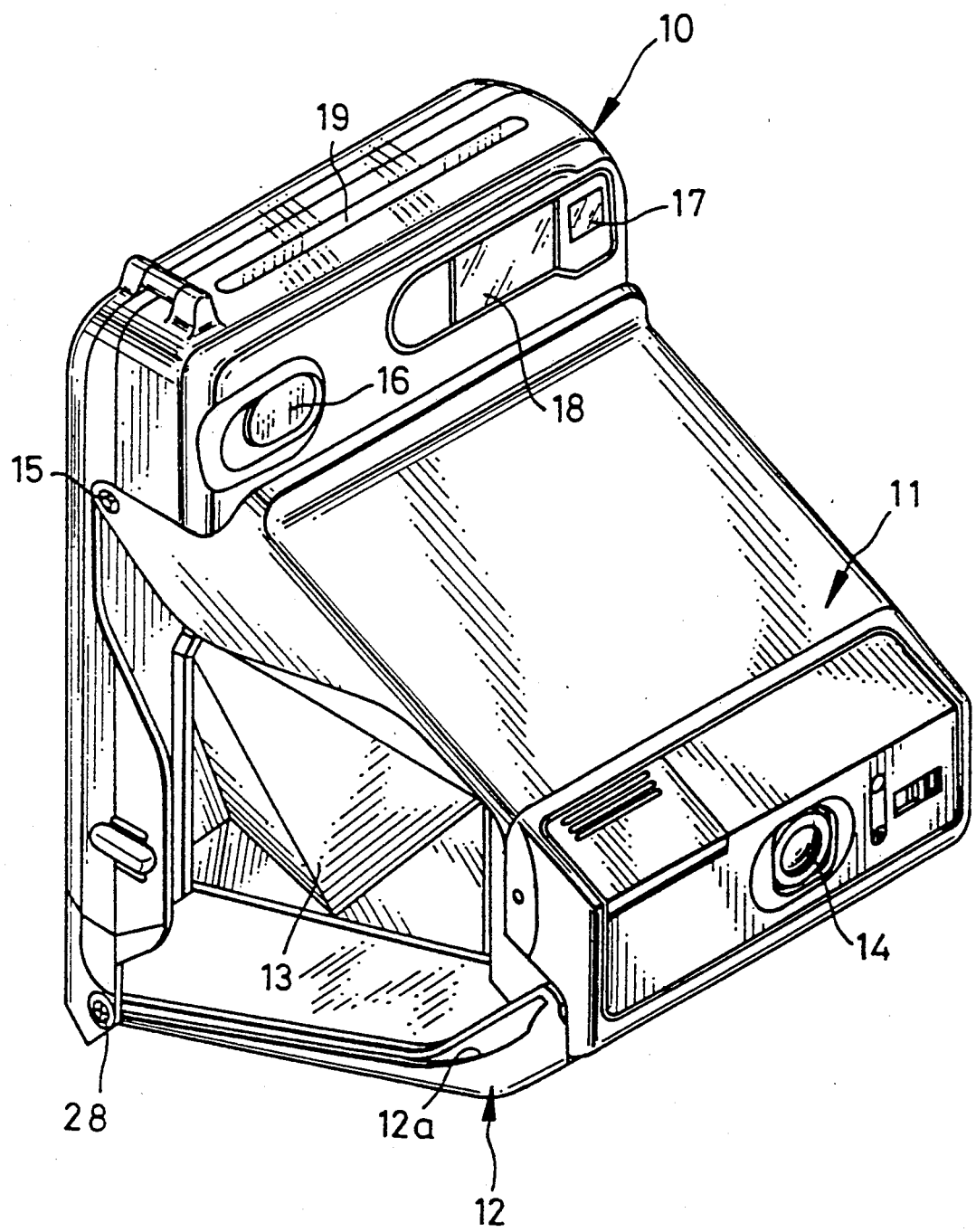
FIG. 1 is a perspective view illustrating an instant camera according to the present invention, in a state wherein it is extended for use.
Figure 2:
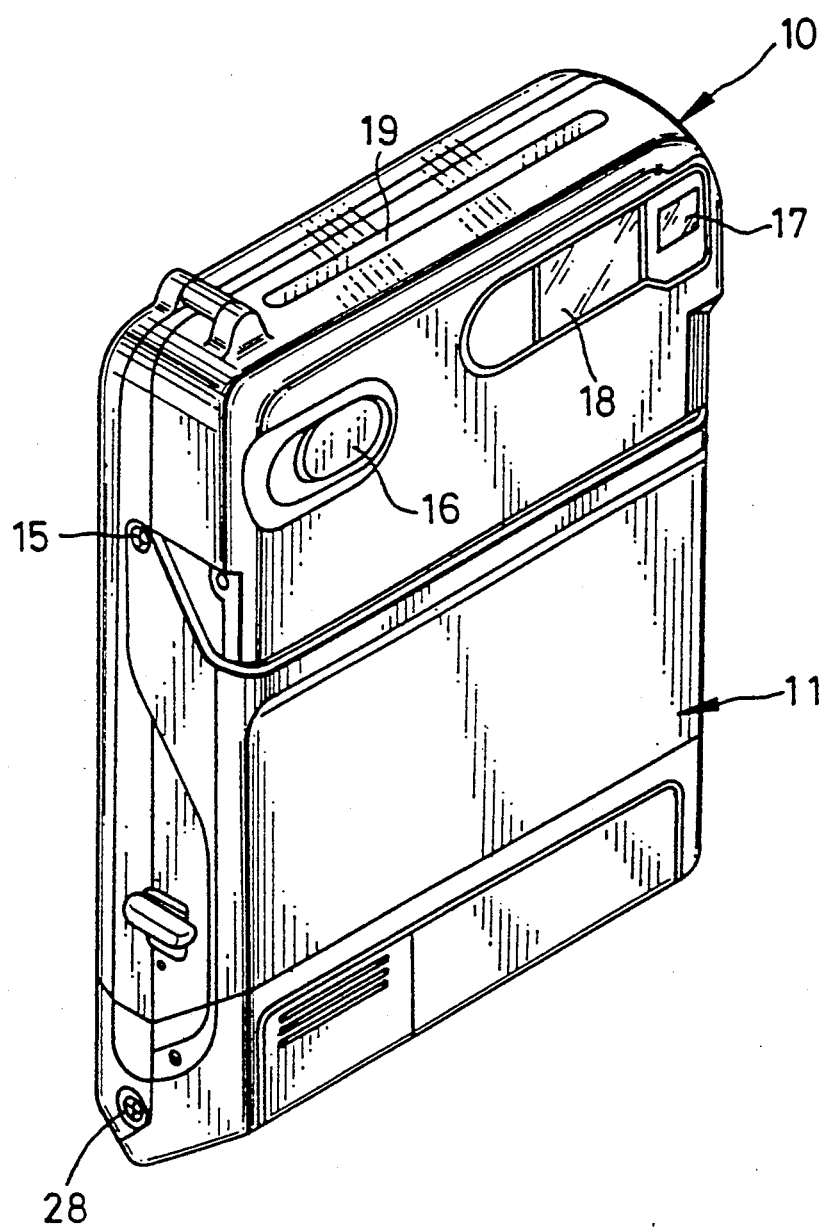
FIG. 2 is a perspective view illustrating a state wherein the instant camera is collapsed and not in use.
Figure 3:
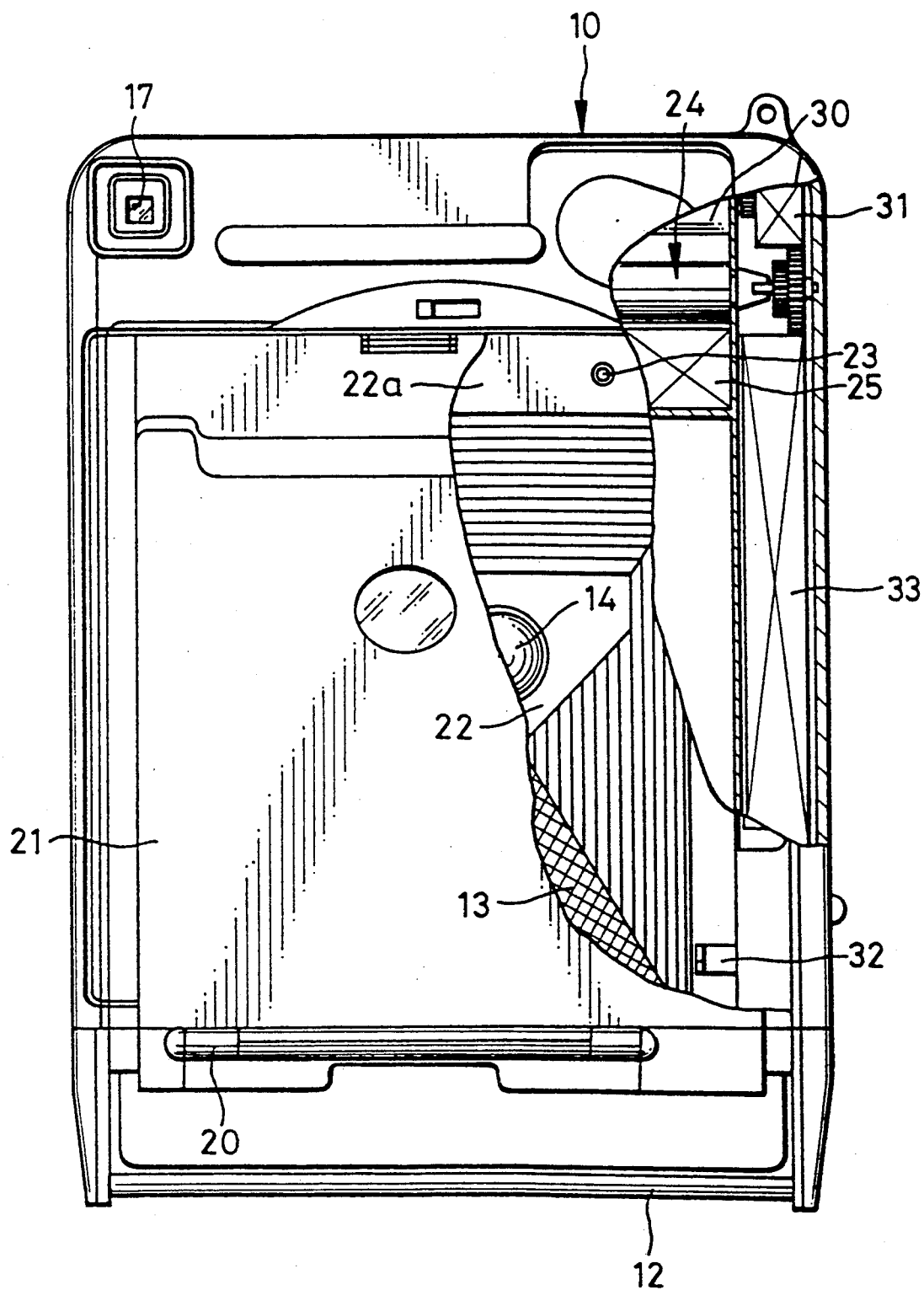
FIG. 3 is a rear elevation, partially broken away, illustrating the state wherein the instant camera is in use.

Referring to FIGS. 1 to 3, an instant camera according to the present invention is constituted by a main body 10 in the shape of a box of small thickness, a lens board 11 that can be extended and collapsed relative to the main body 10, a lens stay plate 12 for supporting the lens board 11 from the lower side in it extended position, and a bellow 13 connecting the main body 10 and the lens board 11 and masking the optical path from extraneous light. The lens board 11 is provided with a taking lens 14 and shutter and diaphragm mechanisms (not shown), and is collapsed on the front side of the main body by rotation around a shaft 15 when the camera is not in use. The lens stay plate 12 is linked to the lens board 11 to be drawn out by linkage when the lens board is extended. When not in use, a guide pine 28 is slid along a groove 12a until the lens stay plate 12 covers the rear surface of a chamber door 21. The bellows 13 is folded up upon the collapse of the lens board 11 and is contained between the main body 10 and the lens board 11. On the main body 10 are provided a shutter button 16, a viewfinder 17 and an electronic flash device 18 on the front, and a withdrawal passage 19 on the top through which a film unit after exposure is ejected.

The chamber door 21 is mounted on the back of the main body 10 via a hinge 20. A film pack chamber 22 is exposed when the chamber door 21 is open, and receives a film pack 2 (see FIG. 4) therein. A receiving surface 22a of the film pack chamber 22 is in contact with the film pack 2 as inserted. In a recess on the inside surface 22a, a reverse rotation button 23 is provided. Upon operating the reverse rotation button 23, a switch is actuated to supply a controller 25 with a signal so as to reversely rotate a motor 30. A pair of spreading rollers 24 comprising rollers 24a and 24b are disposed above chamber 22 for ejecting an exposed film unit 3 and for squeezing a processing solution pod so as to spread the processing solution between the photographic sheets. Parts of the surfaces of the rollers 24a and 24b facing on the film pack 2 are exposed on the inside of the film pack chamber 22. A controller 25 controls the motor 30, the shutter, the flash device 18 and the like.

Figure 4:
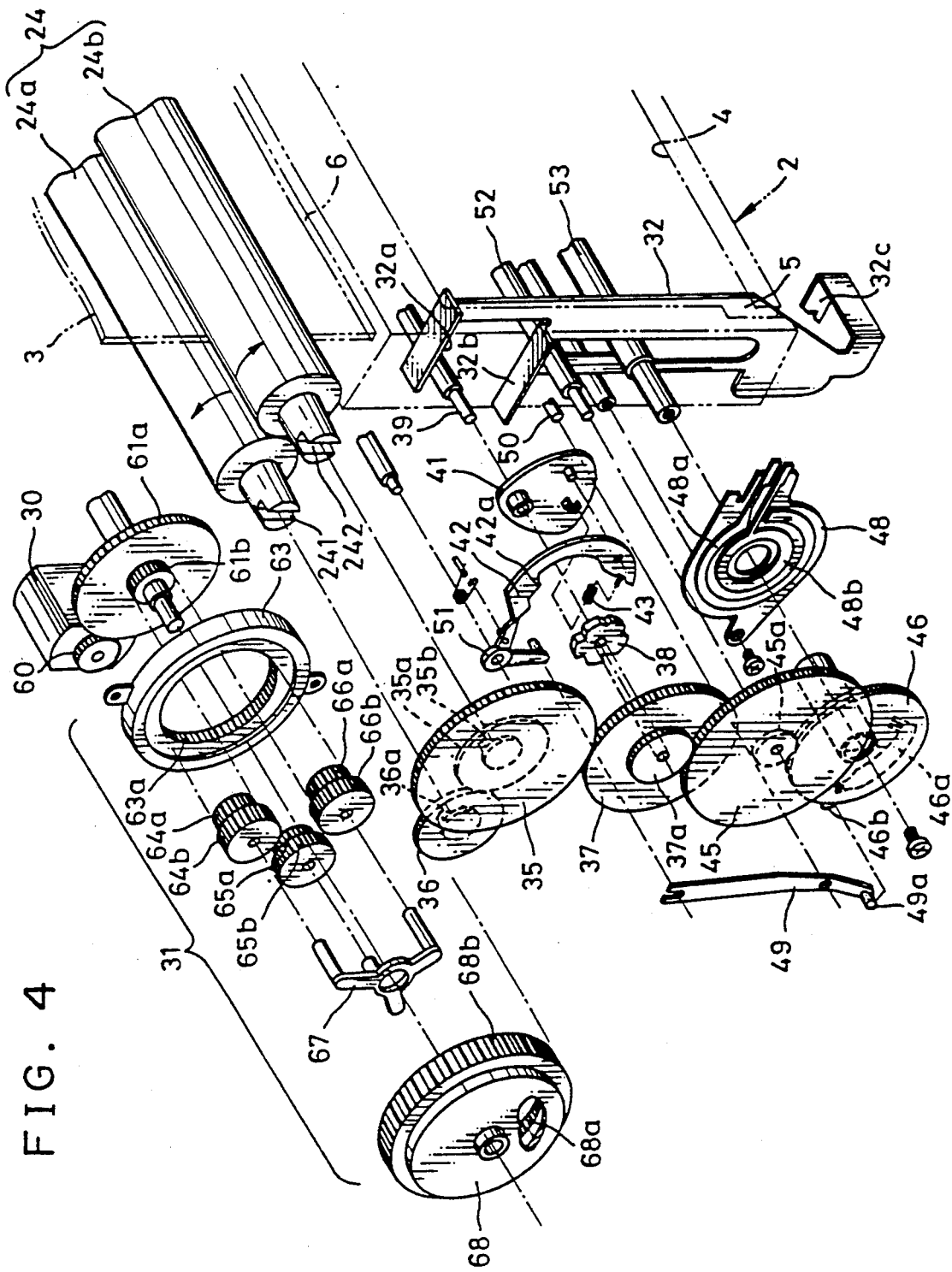
FIG. 4 is an exploded perspective view illustrating an important portion of the internal mechanisms of the instant camera.

As illustrated in FIG. 4, the film pack 2 is box-shaped and contains a plurality, e.g. ten, of film units 3 in a stack. In the film pack 2 on its upper surface are formed an exposure aperture 4 for allowing exposure of the uppermost of the film units 3, and a recess 5 for receiving a claw 32c of a claw member 32 for ejecting the uppermost film unit 3 when exposed. In a front surface of the film pack 2 is formed a slot 6 for emergence of the film unit 3 pressed by the claw 32c. Each of the film units 3 is provided with a photosensitive sheet and an image-receiving sheet bonded together with a predetermined interval therebetween as disclosed in U.S. Pat. No. 5,026,630. The pod containing the processing solution is provided on the front end of the film unit.

In the main body 10 are disposed the motor 30 for driving the spreading rollers 24, a planetary gear mechanism 31 for transmitting the driving force of the motor 30 to the spreading roller pair 24 and a claw drive mechanism 33 for transmitting the driving force of the motor 30 in the normal direction to the claw member 32 via a clutch mechanism. The controller 25 rotates the motor 30 in the normal direction upon actuation of the shutter by operating the shutter button 16, and in the reverse direction upon pushing the reversing button 23 to permit cleaning the spreading roller pair 24. The planetary gear mechanism 31 transmits a large torque to the spreading rollers 24 and the claw by stepping down the speed of rotation of the motor 30.

The rotation of the motor 30 is transmitted to a gear 61a via a motor gear 60. A sun gear 61b is formed integrally with the gear 61a, and is disposed at the center of a fixed ring 63 having an interval gear 63a. Three planet gears 64a, 65a and 66a are disposed at regular intervals in mesh with both the internal gear 63a and the sun gear 61b. The planet gears 64a, 65a and 66a are rotatably supported on three shafts provided on a gear holder 67.

When the sun gear 61b rotates, the planet gears 64a, 65a and 66a rotate on their own axes and simultaneously revolve round the sun gear 61b. Planet gears 64b, 65b and 66b having a larger diameter than the plant gears 64a, 65a and 66a are formed integrally therewith in a corresponding manner. The planet gears 64b, 65b and 66b are in mesh with an internal gear 68a of a drive gear member 68, so that revolution of the planet gears 64b, 65b and 66b about the axis of the sun gear 61b causes the drive gear member 68 to rotate. The rotation of the drive gear member 68 is transmitted to a gear 35 via an external gear 68b formed thereabout. A gear 35a is formed integrally with the gear 35 and is in mesh with a gear 36. Plate-like projections 35b and 36a are formed on the gears 35a and 36, and are coupled with recesses 241 and 242 of the rollers 24a and 24b, and rotate the rollers 24a and 24b.

Rotation of the motor 30 is transmitted to the spreading roller pair 24 and to a gear 37 via the gear 35. The gear 37 makes approximately 3.7 rotations per exposure, and is fixed on the rear of a toothed clutch wheel 38. A claw drive cam 41 is rotatably supported on a shaft 39. When the claw drive cam 41 rotates, it abuts on angled portions 32a and 32b of the claw member 32 and slides the claw member 32 up and down relative to shafts 52 and 53.

A tooth 42a of a clutch lever 42 is coupled with a tooth of the toothed clutch wheel 38 while the motor 30 is rotated in the normal direction, so that the clutch lever 42 moves together with the toothed clutch wheel 38. The claw drive cam 41 is rotated together with the gear 37 via the clutch lever 42 and the toothed clutch wheel 38 so as to cause one reciprocal movement of the claw member 32. When the motor 30 is reversely rotated, the clutch lever 42 is disengaged from the toothed clutch wheel 38, so that the toothed clutch wheel 38 rotates while the claw drive cam 41 remains stationary.

Rotation of the motor 30 is transmitted to a one-revolution gear 46 via gears 37, 37a, 45 and 45a. The one-revolution gear 46 makes one revolution per exposure. A switching contact bridge 46a is fixed on the rear side of gear 46, and includes short-circuiting end portions or brush portions on both ends. A base plate 48 for detecting one revolution of gear 46 is fixed on the main body 10 behind the gear 46 so as to dispose the contact bridge 46a between the X 46 and the base plate 48. Ring contacts 48a and 48b are provided on the base plate 48 for contact with the brush portions of the contact bridge 46a. When the gear 46 has made on revolution, one of the brush portions of the contact bridge 46a is electrically switched off by the ring contact 48a. The base plate 48 is electrically connected to the controller 25, which stops the motor 30 when the contact bridge 46a is switched off by the ring contact 48a. A projection 46b is formed on the periphery of the gear 46. A pin formed on a release lever 51 is fitted in a recess formed on an upper end of a lever 49, so that the lever 49 is connected to the release lever 51 and transmits movement thereto. The release lever 51 is biased clockwise in FIG. 4 by a torsion spring. When the projection 46b is in contact with a pin 49a of the lever 49, the lever 49 is rotated clockwise about a shaft 50 so as to retract the release lever 51 from the path of rotation of the clutch lever 42, which is thus allowed to be in mesh with the toothed clutch wheel 38, because a coil compression spring 43 biases the clutch lever 42 counterclockwise as seen in FIG. 4.

The operation of the present embodiment will now be described.

Figure 5:
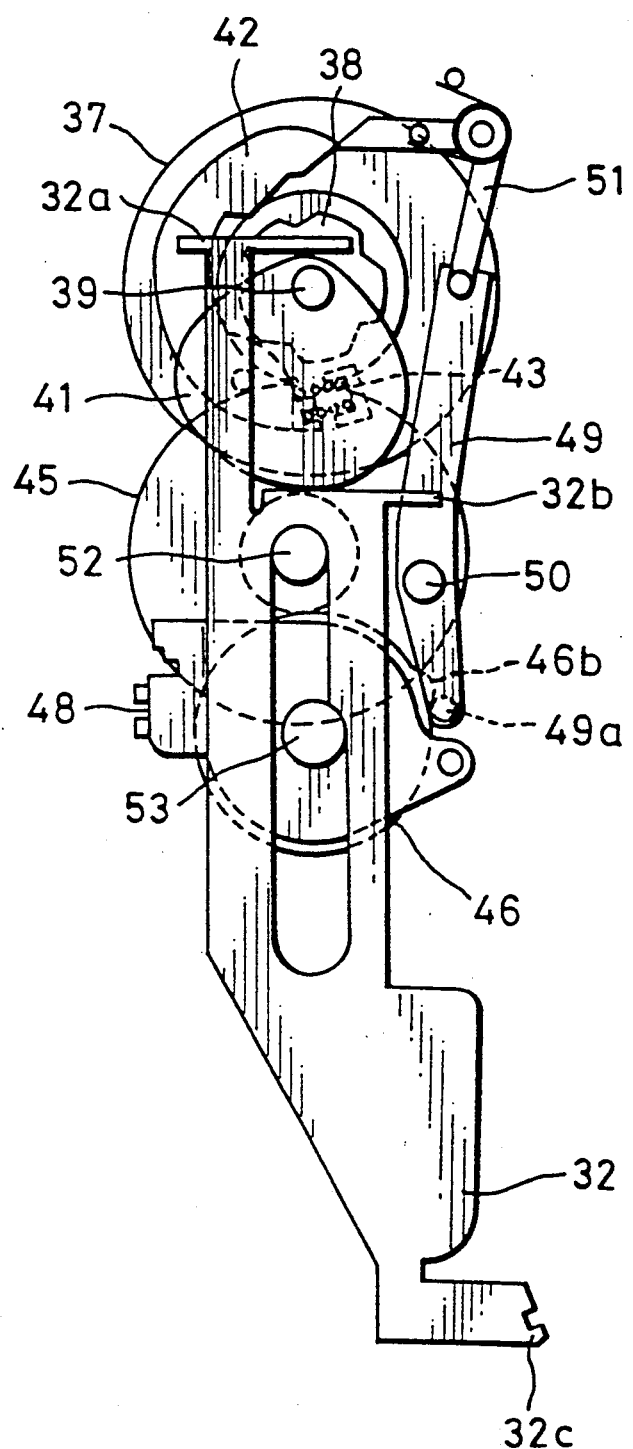
FIG. 5 is a side elevational view illustrating the claw drive mechanism in a state wherein a claw member is in an initial position.

When the instant camera is not in use, the lens board 11 is folded as illustrated in FIG. 2 to collapse the camera into a box-like shape of a small thickness. The projection 46b is free from contact with the pin 49a as illustrated in FIG. 5, so that the release lever 51 keeps the clutch lever 42 free from engagement with the toothed clutch wheel 38. The claw drive cam 41 maintains the angled portion 32b of the claw member 32 depressed, which thus assumes its initial position. The ring contact 48a is not yet in contact with the brush portion of the contact bridge 46a.

To use the instant camera, the front side of the lens board 11 is pulled upward and outward after unlocking the same. The optical axis of the taking lens 14 is brought perpendicular to the chamber door 21 as illustrated in FIG. 1. The lens stay plate 12 moves from the chamber door 21 up to a position protruding from the main body 10. Upon pressing the shutter button 16, the shutter/diaphragm mechanisms are actuated to allow light to pass through the taking lens 14 and to enter the exposure aperture 4 of the film pack 2 to expose the uppermost film unit.

When the shutter closes, the motor 30 starts to rotate. Rotation of the motor 30 is transmitted via the gear mechanism 31 and the gears 35, 35a and 36 to the spreading roller pair 24, which rotate in the ejecting directions as indicated by the arrows in FIG. 4. The rotation of the motor 30 is transmitted to the one-revolution gear 46 via the gears 35, 37, 37a, 45 and 45a. When the gear 46 rotates, the projection 46b is in contact with the pin 49a to retract the release lever 51 from the region wherein the clutch lever 42 is rotatable. The brush portion of the contact bridge 46a is in contact with the ring contact 48a to electrically connect the ring contacts 48a and 48b with each other.

When the release lever 51 is retracted from the path of rotation of the clutch lever 42, the clutch lever 42 is engaged with the clutch tooth wheel 38 by being biased by the spring 43. Because the gear 37 rotates as described above, the claw drive cam 41 rotates to slide the claw member 32. The claw 32c of the claw member 32 enters the recess 5 formed in the film pack 2, abuts the rear end of the exposed film unit 3, and pushes it toward the spreading roller pair 24. The front end of the exposed film unit 3 exits from the film pack 2 through the slot 6 and caught between the rotating spreading roller pair 24. The processing solution pod, mounted on the forward end of the film unit 3, is ruptured by the spreading roller pair 24, so that the processing solution enclosed in the pod is spread at a given thickness between the photosensitive sheet and the image-receiving sheet while the film unit 3 is being ejected through the withdrawal passage 19. Development of the film unit 3 is effected by the processing solution so that a positive image gradually appears on the rear side of the image-receiving sheet.

When the one-revolution gear 46 rotates further until the projection 46b is disengaged form the pin 49a, the release lever 51 returns to the region wherein the clutch lever 42 is rotatable. When the clutch lever 42 rotates by exactly one rotation as measured from the initial position, the release lever 52 abuts the end of the clutch lever 42 so as to disengage the clutch lever 42 from the teeth of the clutch tooth wheel 38. The claw member 32 makes one cycle of reciprocal movement per exposure. The toothed clutch wheel 38 continues to rotate even after disengagement from the clutch lever 42 and makes about 3.7 rotations per exposure. When the brush portion of the contact bridge 46a is freed from engagement with the ring contact 48a at the end of one rotation of the gear 46, the controller 25 stops the motor 30 from rotating in the normal direction.

The processing solution of the film unit 3 can stick to the spreading roller pair 24 if the film unit 3 is faulty and the processing solution leaks. Moreover, dirt can stick thereto. The spreading roller pair 24 should then be cleaned. For this cleaning operation, the film pack chamber 22 is emptied.

To perform cleaning, the chamber door 21 is opened to expose the lower side of the spreading roller pair 24, which is the side that faces the film pack 2. Then the reversing button 23 is depressed to rotate the motor 30 by means of the controller 25. The planetary gear mechanism 34 and the gears 35, 35a and 36 transmit rotation of the motor 30 to the spreading roller pair 24 in directions opposite to the arrows, that is, in directions opposite to those for ejecting the film unit 3 through the withdrawal passage 19. While the spreading roller pair 24 thus reversely rotates, the dirt or processing solution can be wiped away by applying a cleaning cloth to the roller pair 24. As the spreading roller pair 24 are reversely rotating, the cloth will never be caught between the roller pair 24 during the cleaning operation.

Figure 6:
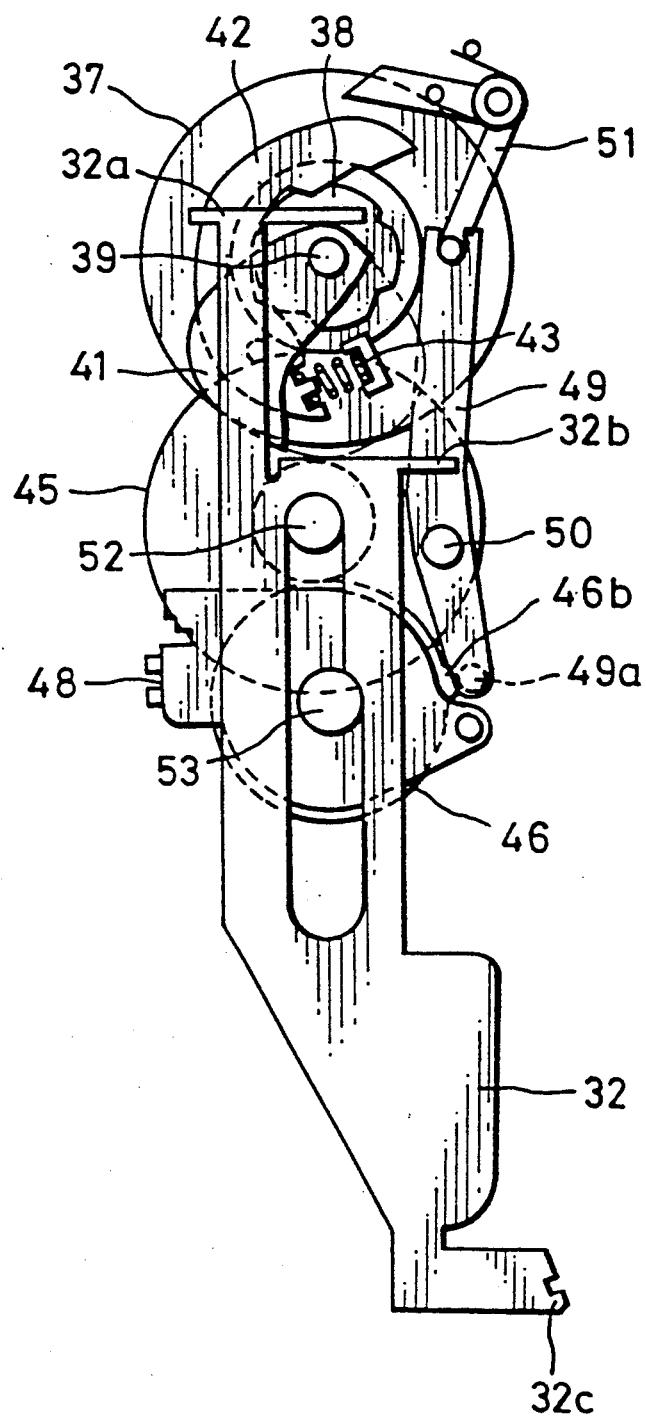
FIG. 6 is a view, similar to FIG. 5, illustrating a state wherein the claw member is starting a reciprocal movement to eject an exposed film unit.

Although reverse rotation of the motor 30 is transmitted to the toothed clutch wheel 38 via the gears 35 and 37, it is not transmitted to the claw member 32 because the toothed clutch wheel 38 is rotated counterclockwise in FIGS. 5 and 6 and is disengaged from the clutch lever 41. The rotation of the motor 30 is transmitted to the gear 46 via the gears 37, 37a, 45 and 45a. When rotation of the gear 46 electrically connects the ring contacts 48a and 48b together via the contact bridge 46a, the motor 30 continues reverse rotation even with the reversing button 23 freed. One full rotation of the one-revolution gear 46 electrically disconnects the ring contacts 48a and 48b. Then the controller 25 stops the motor 20 from reversely rotating.

Although the present invention has been fully described by way of the preferred embodiment thereof with reference to the accompanying drawings, various changes and modifications will be apparent to those having skill in this field. Therefore, unless otherwise these changes and modifications depart form the scope of the present invention, they should be construed as being included therein.

What is claimed is:

1. An instant camera including a claw member for ejecting a film unit after exposure from a film pack and a pair of spreading rollers for applying pressure to said film unit in order to spread processing solution and for ejecting said film unit from said instant camera when rotating in one direction, said instant camera comprising:

a motor;

a roller drive mechanism for transmitting rotation of said motor to said pair of spreading rollers in said one direction when said motor rotates in a forward direction;

a clutch mechanism which has an engaged position when said motor rotates in said forward direction and a disengaged position when said motor rotates in reverse direction;

a claw drive mechanism for transmitting rotation of said motor to said claw member via said clutch mechanism when said clutch mechanism is in said engaged position;

control means for causing said motor to rotate in said forward direction upon photographing and to rotate in said reverse direction when cleaning, said pair of spreading rollers rotating reversely when said motor rotates in said reverse direction and said claw member is kept free by said clutch mechanism from being operated; and an operable member for directing said control means to rotate said motor in said reverse direction.

2. An instant camera as claimed in claim 1, further comprising motor stopping means for stopping said motor when said motor has completed a predetermined amount of rotation.

3. An instant camera as claimed in claim 1, wherein said operable member is disposed on a wall of a chamber wherein said film pack is contained.

4. An instant camera as claimed in claim 1, wherein said clutch mechanism is disposed between said roller drive mechanism and said claw drive mechanism, and transmits rotation of said roller drive mechanism to said claw drive mechanism while said motor rotates in said one direction.

5. An instant camera as claimed in claim 1, further comprising a planetary gear mechanism for transmitting rotation of said motor to said roller drive mechanism at a reduced speed of rotation.

6. An instant camera as claimed in claim 5, wherein said planetary gear mechanism includes:

a sun gear rotated by said motor;

a first internal gear disposed stationarily about said sun gear;

a first planetary gear group having first N planet gears in mesh with both said sun gear and said first internal gear;

a second planetary gear group having second N planet gears formed integrally with said corresponding first N planet gears; and a drive gear provided with external teeth and second internal teeth, said second internal teeth being in mesh with said second planetary gear group, said external teeth being in mesh with a first gear of said roller drive mechanism.

7. An instant camera as claimed in claim 6, wherein N is three.

8. An instant camera as claimed in claim 6, wherein said roller drive mechanism includes a second gear formed integrally with said first gear and a third gear in mesh with said second gear, said second and third gears rotating said pair of spreading rollers.

9. An instant camera as claimed in claim 8, wherein said clutch mechanism includes:

a fourth gear in mesh with said first gear;

a toothed clutch wheel formed integrally with said fourth gear;

a clutch lever engageable with said toothed clutch wheel when said motor rotates in said one direction;

a rotatable claw drive cam for reciprocally moving said claw member, said clutch lever being mounted on said claw drive cam swingably in cantilever fashion, said claw drive cam rotating together with said toothed clutch wheel while said clutch lever is engaged with said toothed clutch wheel;

a clutch disconnecting member for bringing said clutch mechanism forcibly into said disengaged position while said motor rotates in said one direction, said clutch disconnecting member, in a locked position, disengaging said clutch lever form said toothed clutch wheel by receiving a free end of said clutch lever when said claw drive cam has made one rotation; and clutch control means for moving said clutch disconnecting member to an unlocked position in order to free said clutch lever so as to allow engaging said clutch lever from said toothed clutch wheel.

10. An instant camera as claimed in claim 2, wherein said motor stopping means includes a rotary member for making one rotation when said motor has completed said predetermined amount of rotation, a contact bridge fixed on said rotary member, and a ring contact pattern for contact with said contract bridge.

11. An instant camera as claimed in claim 10, wherein said ring contact pattern includes a first ring contact and a second ring contact which is discontinuous in one portion thereof.

12. An instant camera as claimed in claim 10, wherein said clutch control means includes a lever of which an end is connected to said clutch disconnecting member, and a cam projection provided on a rotary member for swinging said lever in order to move said clutch disconnecting member to said unlocked position.

* * * * *